US008521183B2

(12) United States Patent
Sennett et al.

(10) Patent No.: US 8,521,183 B2
(45) Date of Patent: *Aug. 27, 2013

(54) LOCALIZED DETECTION OF MOBILE DEVICES

(71) Applicant: AT&T Mobility II LLC, Atlanta, GA (US)

(72) Inventors: DeWayne Allan Sennett, Redmond, WA (US); Brian Kevin Daly, Peachtree Corners, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/774,558

(22) Filed: Feb. 22, 2013

(65) Prior Publication Data

US 2013/0171979 A1 Jul. 4, 2013

Related U.S. Application Data

(63) Continuation of application No. 12/059,845, filed on Mar. 31, 2008, now Pat. No. 8,417,259.

(51) Int. Cl.
H04W 24/00 (2009.01)

(52) U.S. Cl.
USPC ..... 455/456.1; 455/434; 455/509; 455/67.11; 455/90.3; 370/252; 713/170; 713/161

(58) Field of Classification Search
USPC ................ 455/434, 509, 16, 450, 435.1, 445, 455/433, 456.1, 67.11, 90.3; 343/702, 895, 343/725, 848, 825; 365/51, 244, 63; 713/322, 713/321, 170, 161; 370/252
See application file for complete search history.

(56) References Cited

U.S. PATENT DOCUMENTS

| 5,648,770 | A | * | 7/1997 | Ross ............................ 340/994 |
| 6,112,075 | A | | 8/2000 | Weiser |
| 7,581,242 | B1 | * | 8/2009 | Oget et al. ........................ 726/2 |
| 7,756,082 | B1 | * | 7/2010 | Dhamdhere .................. 370/331 |
| 2002/0173283 | A1 | * | 11/2002 | Morewitz et al. ............. 455/130 |
| 2005/0037721 | A1 | * | 2/2005 | Benz et al. ................. 455/187.1 |
| 2005/0191958 | A1 | * | 9/2005 | Hoskins ....................... 455/3.01 |
| 2005/0259658 | A1 | * | 11/2005 | Logan et al. .................. 370/392 |
| 2006/0040639 | A1 | | 2/2006 | Karl et al. |
| 2006/0116170 | A1 | * | 6/2006 | Brahmbhatt et al. ......... 455/560 |
| 2006/0255131 | A1 | * | 11/2006 | Stewart ........................ 235/383 |
| 2007/0044095 | A1 | * | 2/2007 | Banerjee ...................... 717/176 |
| 2009/0146791 | A1 | * | 6/2009 | Jantunen et al. ............. 340/10.2 |

* cited by examiner

Primary Examiner — Mahendra Patel
(74) Attorney, Agent, or Firm — Woodcock Washburn LLP

(57) ABSTRACT

Various aspects are disclosed herein for detection of mobile devices. Detection of mobile devices can be localized to an environment that is radio frequency enclosed. Within this environment, any packages can be scanned for the presence of mobile devices and for the interrogation of information from such mobile devices, such as the mobile device number and mobile device equipment information. The environment can contain an antenna for communicating with any mobile devices within the environment and a receiver component configured to receive information from any contacted mobile device. Based on this information, a determination can be made whether to validate a contacted mobile device or to take any alternative action.

15 Claims, 8 Drawing Sheets

LOCALIZED DETECTION OF MOBILE DEVICES

CROSS REFERENCE TO RELATED APPLICATION

The instant application is a continuation application of, and claims priority to, U.S. patent application Ser. No. 12/059,845 filed Mar. 31, 2008. U.S. patent application Ser. No. 12/059,845 is hereby incorporated by reference in its entirety.

COPYRIGHT NOTICE AND PERMISSION

A portion of the disclosure of this document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright ©2008 AT&T Mobility II LLC.

FIELD OF TECHNOLOGY

The presently disclosed subject matter relates to the field of computing, and more particularly, to fields such as detection of computing devices, although this is merely an exemplary and non-limiting field.

BACKGROUND

Scanning for packages that may contain mobile devices is important to various security systems. Passive scanning, such as using x-rays, can at times reveal that a mobile device may be present in a package, however, no other useful information can be garnered using such passive security systems. Thus, active security measures are needed that will yield richer information about potentially dangerous mobile devices.

SUMMARY

Various aspects are disclosed herein for detection of mobile devices. Detection of mobile devices can be localized to an environment that is radio frequency enclosed. Within this environment, any packages can be scanned for the presence of mobile devices and for the interrogation of information from such mobile devices, such as the mobile device number and mobile device equipment information.

The environment can contain an antenna for communicating with any mobile devices within the environment and a receiver component configured to receive information from any contacted mobile device. Based on this information, a determination can be made whether to validate a contacted mobile device or to take any alternative action.

It should be noted that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing Summary, as well as the following Detailed Description, is better understood when read in conjunction with the appended drawings. It should be noted that the present disclosure is not limited to the specific aspects shown. The following figures are included.

DETAILED DESCRIPTION

Figure 1:
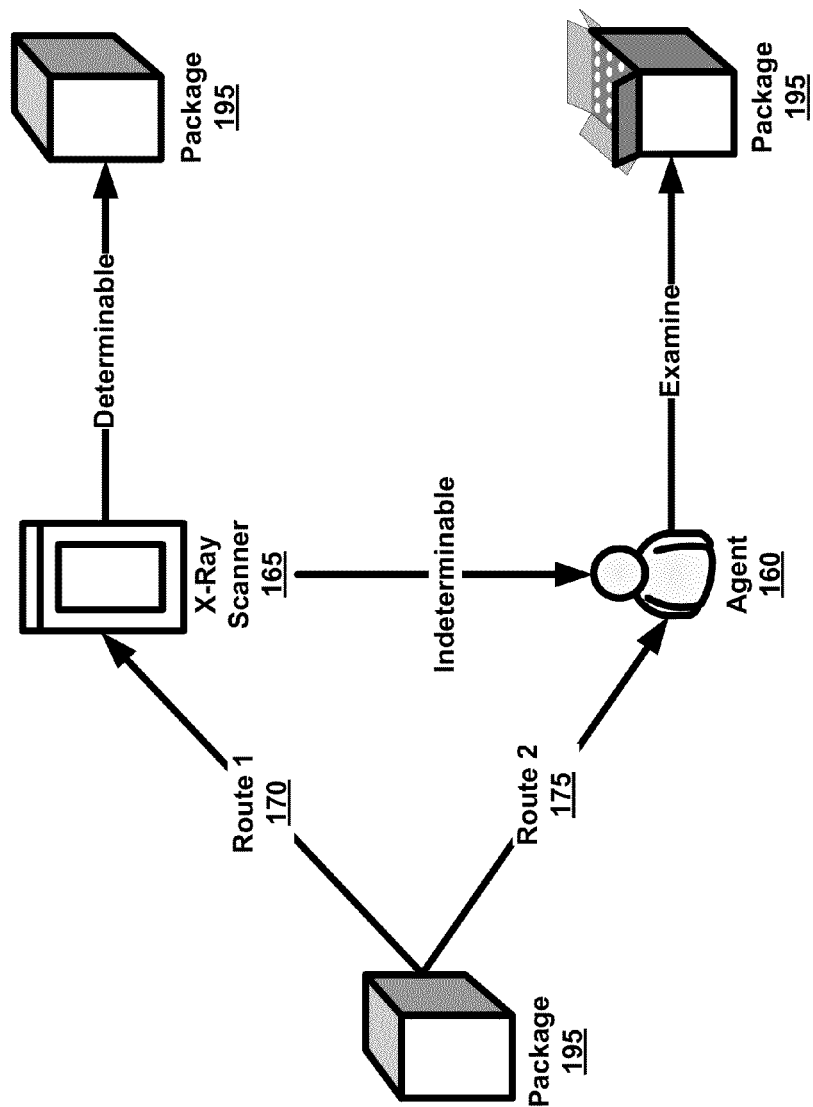
FIG. 1 illustrates that in the prior art packages may have been passively scanned.

FIG. 1 illustrates that in the prior art packages may have been passively scanned. In FIG. 1, a package 195 was routed 170 to an x-ray scanner 165, or in the alternative, it was routed 175 to an agent 160 for examination. Moreover, in the scenario where the x-ray scanner 165 could not make an acceptable determination, the package 195 was forward to the agent 160 for a personal examination.

In the former scenario where the x-ray scanner 165 was examining contents of a package, at most what could be known was that there may been a computing device present, such as a mobile device, in the package 195. However, no other information could be ascertained regarding the mobile device itself, such as the mobile device phone number or mobile device equipment information (for example, model, make, year, and so on).

Figure 2:
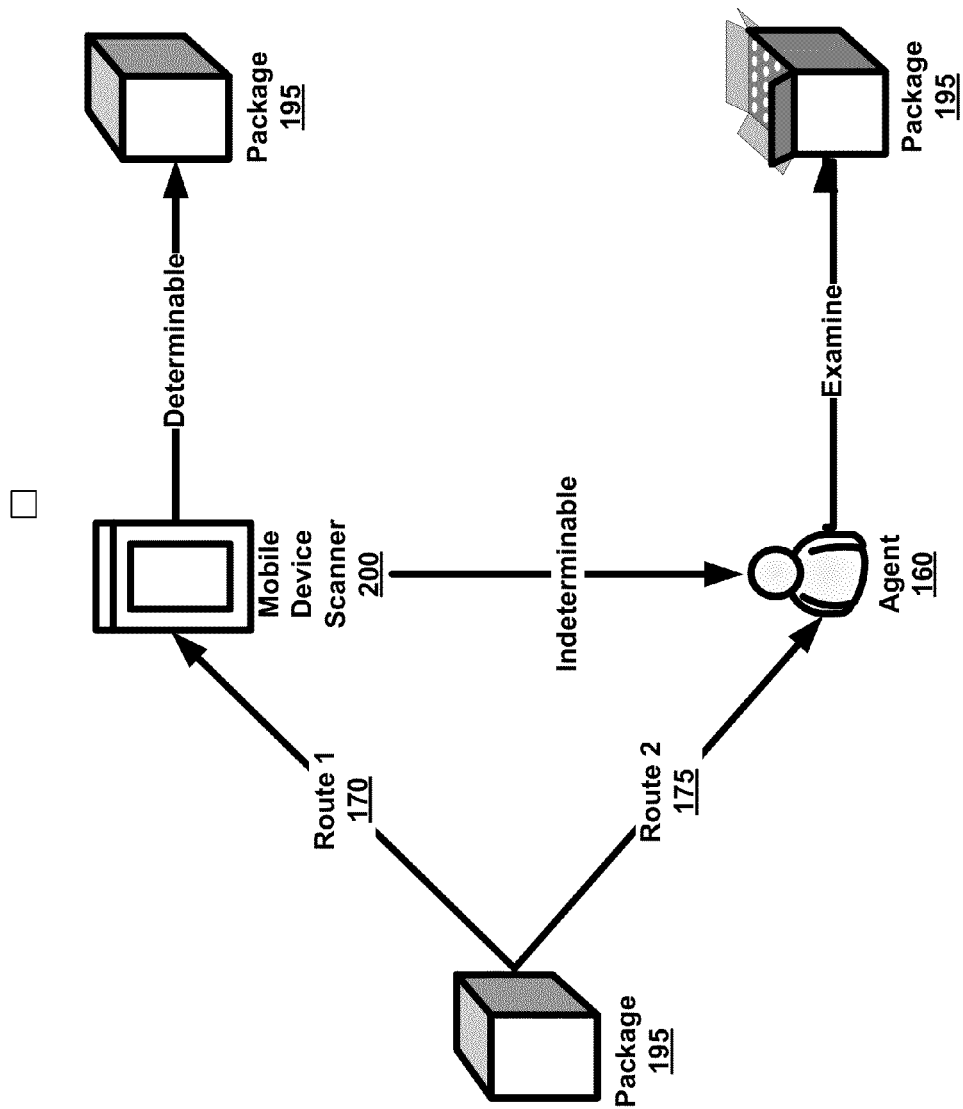
FIG. 2 illustrates that in contrast to FIG. 1, packages can be actively scanned using a mobile device scanner.

FIG. 2 illustrates that in contrast to FIG. 1, packages can be actively scanned in order to obtain mobile device information. Thus, in FIG. 2 if a package 195 is routed to a mobile device scanner 200 (in contrast to being routed to a passive x-ray scanner 165 shown in FIG. 1), this scanner 200 can obtain useful information about any mobile devices in the package 195.

Thus, in one aspect of the presently disclosed subject matter, the mobile device scanner 200 can force any mobile device in the package 195 to interact with the scanner 200, just as any mobile device would interact with a cellular tower or some other communication component or relay. The scanner 200 could send a plurality of signals to the mobile devices, eventually resulting in a response (if the scanner 200 has a list of all the usable mobile device signals, it can go down this list and send a signal at each listed frequency).

Figure 3:
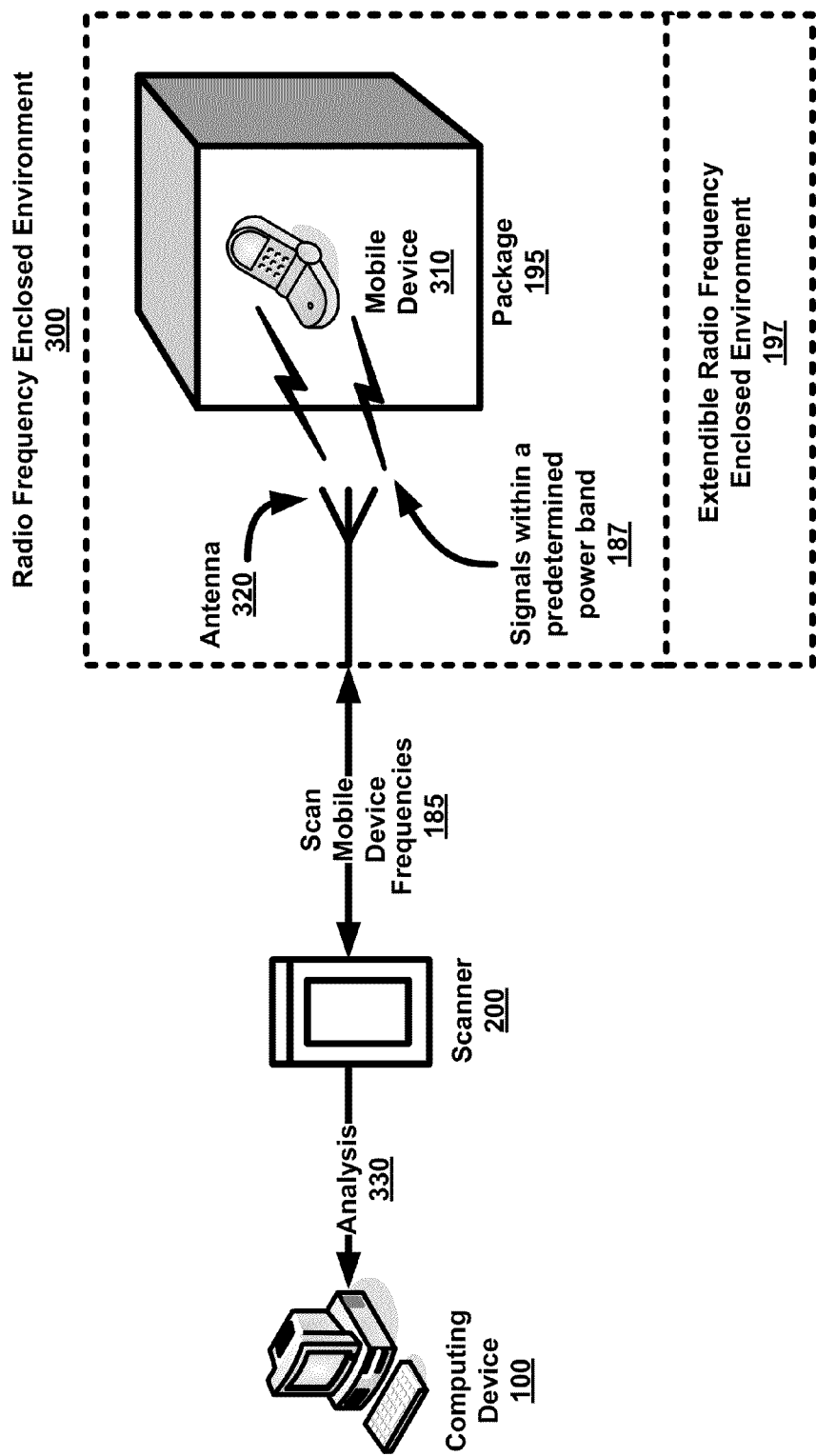
FIG. 3 illustrates that in order to provide a localized detection of mobile devices, a radio frequency environment is used in conjunction with the aforementioned mobile device scanner.

FIG. 3 illustrates that in order to provide a localized detection of mobile devices, a radio frequency environment is used in conjunction with the aforementioned mobile device scanner. In FIG. 3, the scanner 200 can scan a plurality of bands of frequencies 185 that are typically used by a mobile device 310. Using a broadcasting antenna 320 inside a radio frequency enclosed environment 300, the scanner 200 can communicate with the mobile device 310 (residing in a package 195).

Because the radio frequency enclosed environment limits the range of communications to the environment 300 itself, the mobile device 310 is forced to communicate with the scanner 200 via the antenna 320. The scanner can interrogate the mobile device 310 for any information that could be typically asked for by a cellular tower or a mobile device carrier. In addition, in some aspects of the presently disclosed subject matter, the scanner 200 could also exercise control over the mobile device 310, such as having the ability to disable it (e.g. turn it off).

In another aspect of the presently disclosed subject matter, the signal emitted by the antenna 320 and controlled by a broadcast component (shown in FIG. 4) can be adjustable in strength in order to permeate different package 195 materials. Moreover, the signal strength 187 can be controlled to be high enough to communicate with the mobile device 310, but not so strong that it would permeate out of the environment 300. Thus, both the signal strength 187 and the environment 300 can be adjustable so that any interrogation of the mobile device 310 is localized to the environment 300. Furthermore, the environment can not only be radio frequency adjustable but also physically adjustable and thus extensible 197 to include any overflow packages (not shown) that may not fit within the original environment 300.

Lastly, FIG. 3 shows that the scanner 200 could be communicatively coupled to a computing device 100 (such as the one shown in FIG. 7), where this computing device could analyze the results obtained by the scanner 200. Based on the results, a plurality of actions could be taken, as is discussed below.

Figure 4:
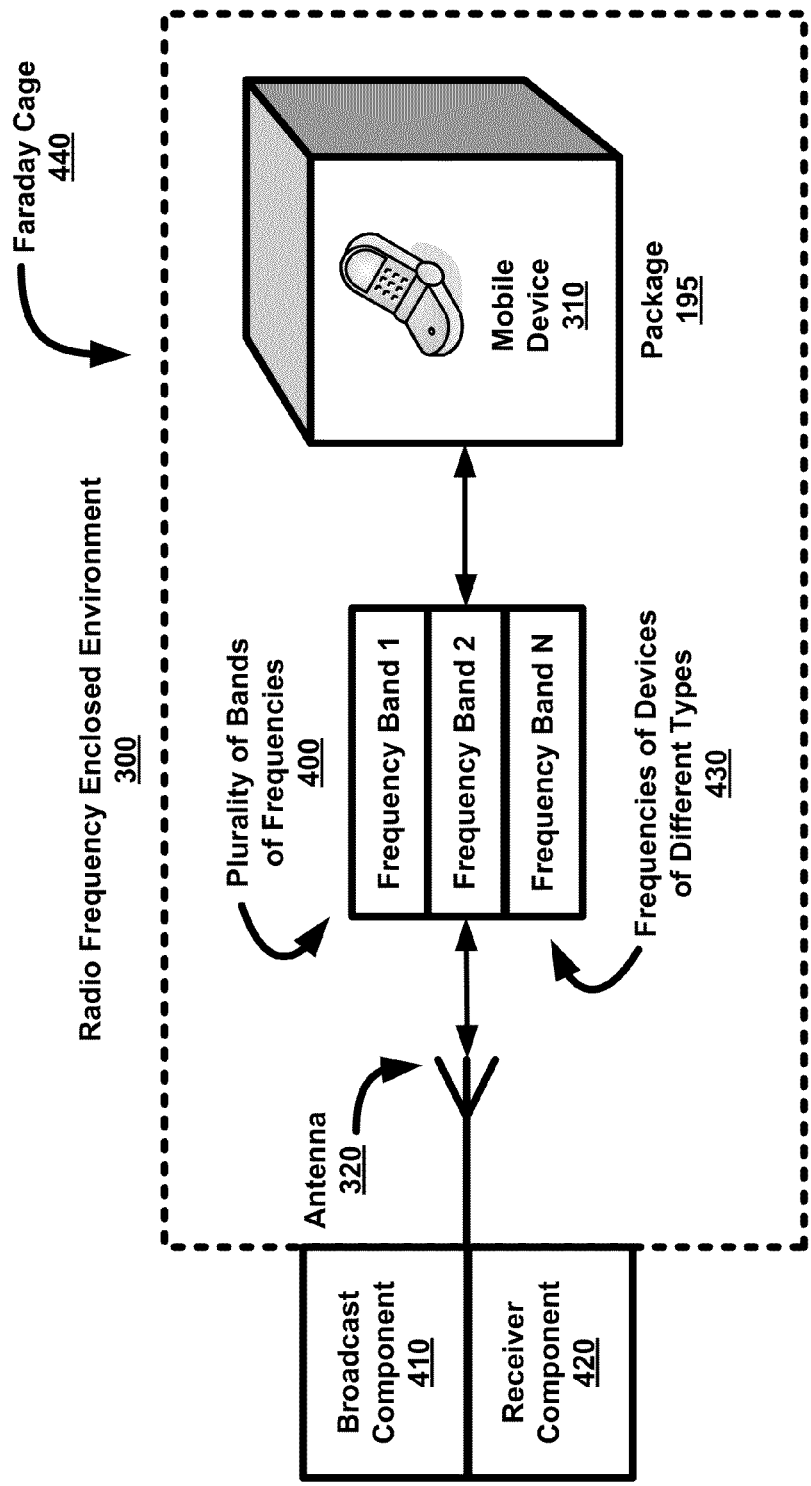
FIG. 4 provides a more detailed view of how the mobile device scanner interacts with a mobile device placed in an enclosed radio frequency environment.

FIG. 4 illustrates a more detailed view of how the mobile device scanner interacts with a mobile device placed in an enclosed radio frequency environment. In FIG. 4, a broadcast component 410 can broadcast a signal via the shown antenna 320. It should be noted that this broadcast component 410 can be a part of the scanner 200 or it can be a separate component. Moreover, the notion of a "component" contemplates herein both software "modules" and hardware "devices," as those terms are understood by those of skill in the art.

The broadcast component 410 can send out a signal within the radio frequency environment 300. The signal can include any or all of a plurality of bands of frequencies 400. Since the broadcast component 410 may not know ahead of time the frequency at which the mobile device 310 communicates, it may have to go through a list of different frequencies in different bands before it established communications with the mobile device 310.

By way of example and not limitation, the broadcast component 410 can first send out frequencies in a first frequency band 1, and if does not establish communications with the mobile device 310 in this band, it can move on to the next band of frequencies, such as frequency band 2. Moreover, it should be noted that the broadcast component can broadcast the appropriate protocol control information in the associated frequency. For example, CDMA and GSM operate in the same frequency bands and different protocols would be used. Furthermore, WiFi is in a different frequency band than these other frequency bands and has its own protocol (WiMAX is in still another band, and so on.). Thus, the broadcast component 410 can scan various frequencies and employ various protocols in the associated frequencies.

Alternatively, if it does find a viable communication frequency, it can stop scanning the remaining frequencies. Yet in different aspects of the presently disclosed subject matter, the broadcast component 410 can run though an entire list of frequencies in order to find the best frequency to communicate with the mobile device 310—thus, even if it finds a communication worthy frequency it can keep searching for still a better frequency (and this can be done in background mode as a selected frequency is being used for communication).

The various frequencies that the broadcast component 410 scans can correspond to devices of different types, such as cell phones, personal digital assistants, laptops, and so on. Thus, various communications standards can be scanned by the broadcast component 410, including global system for mobile (GSM) communications, wireless fidelity (Wi-Fi), Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), and so on. Those of skill in the art will readily appreciate the numerous communications standards that are used by mobile devices, and the broadcast component 410 can use any one (or all) of these communications standards.

Figure 5:
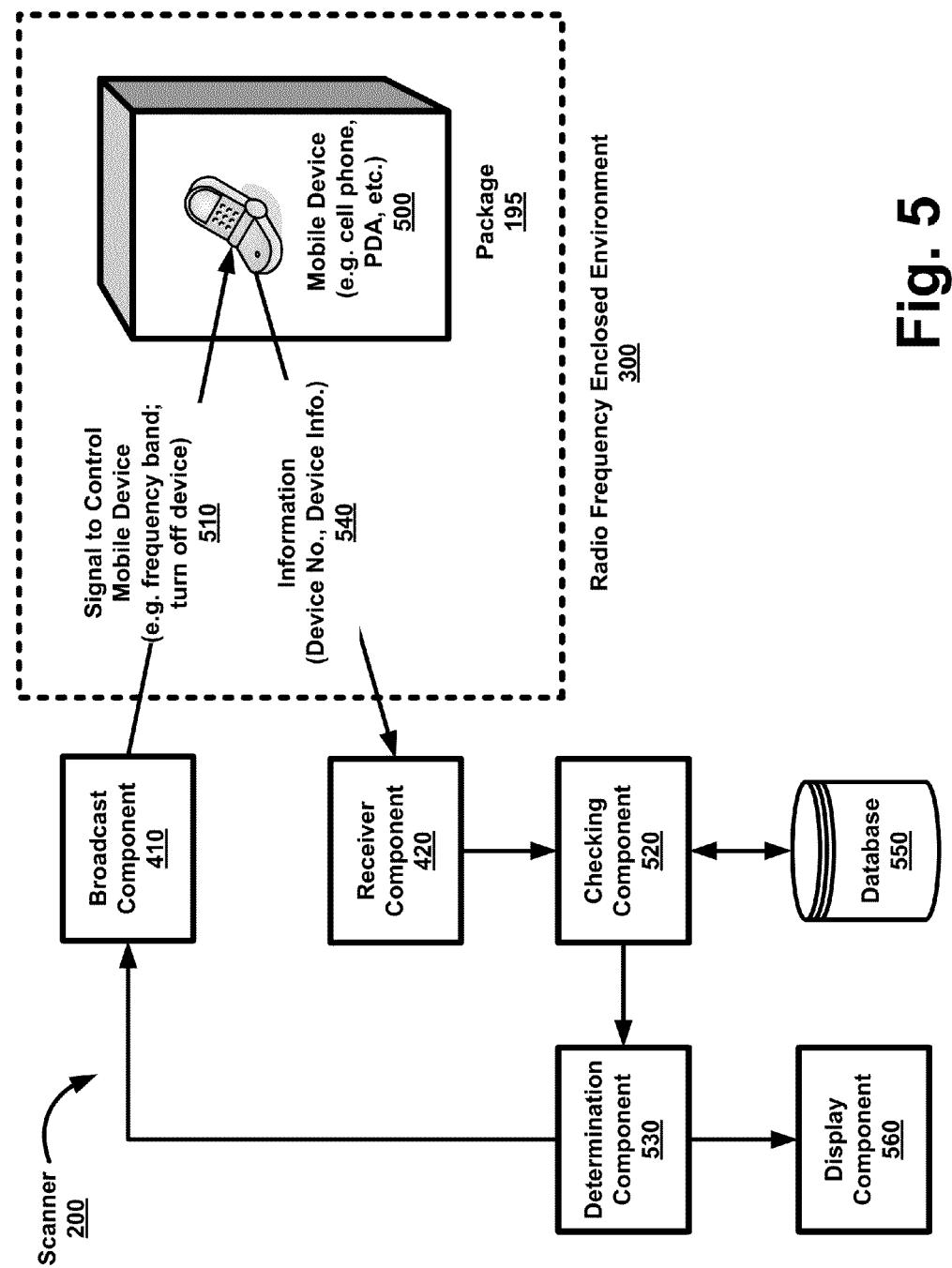
FIG. 5 illustrates various components that can be used in detecting mobile devices in an enclosed radio frequency environment.

FIG. 5 illustrates various components that can be used in connection with localized detection of mobile device presence and information. The notion of using "localized" detection is understood herein to mean detecting mobile devices local to the radio frequency enclosed environment. FIG. 5 shows that a broadcast component 410 can send a signal to a mobile device 500 enclosed within a radio frequency environment 300. If the mobile device 500 communicates with the broadcast component 410, it can be interrogated about information regarding its phone number and/or equipment information 540.

The receiver component 420 can be configured to receive sought after information and can forward this information to a checking component 520. The checking component 520 can access a local or remote database 550 and examine the received information by the receiver component 420 against data in the database 550. The data in the database 550 can include cross-references of phone numbers assigned to the name of an individual, the social security numbers of individuals, criminal records, financial histories, and so on. In the end, once the checking component 520 has compared the information received from the mobile device 500 to the information obtained from the database 550, a determination can be on how to proceed with the package 195.

In other words, if the mobile device 500 is validated and not of concern according to the determination component 530, the package 195 can be released from the radio frequency environment 300. If, however, the mobile device 500 is not responding to the plurality of signals sent from the broadcast component 410, an agent 160 may have to personally inspect the package 195 (as shown in FIG. 2). Alternatively, if the mobile device 500 is of concern because, for example, it provides information inconsistent with information obtained from the database 550, at that point either the agent 160 may inspect the package 195 or any mobile devices of concern in the package 195 can be controlled by the broadcast component 410 (e.g. turned off, have their incoming and outgoing communications cut off—except, in other aspects, those communications that would occur with the broadcast component 410).

Figure 6:
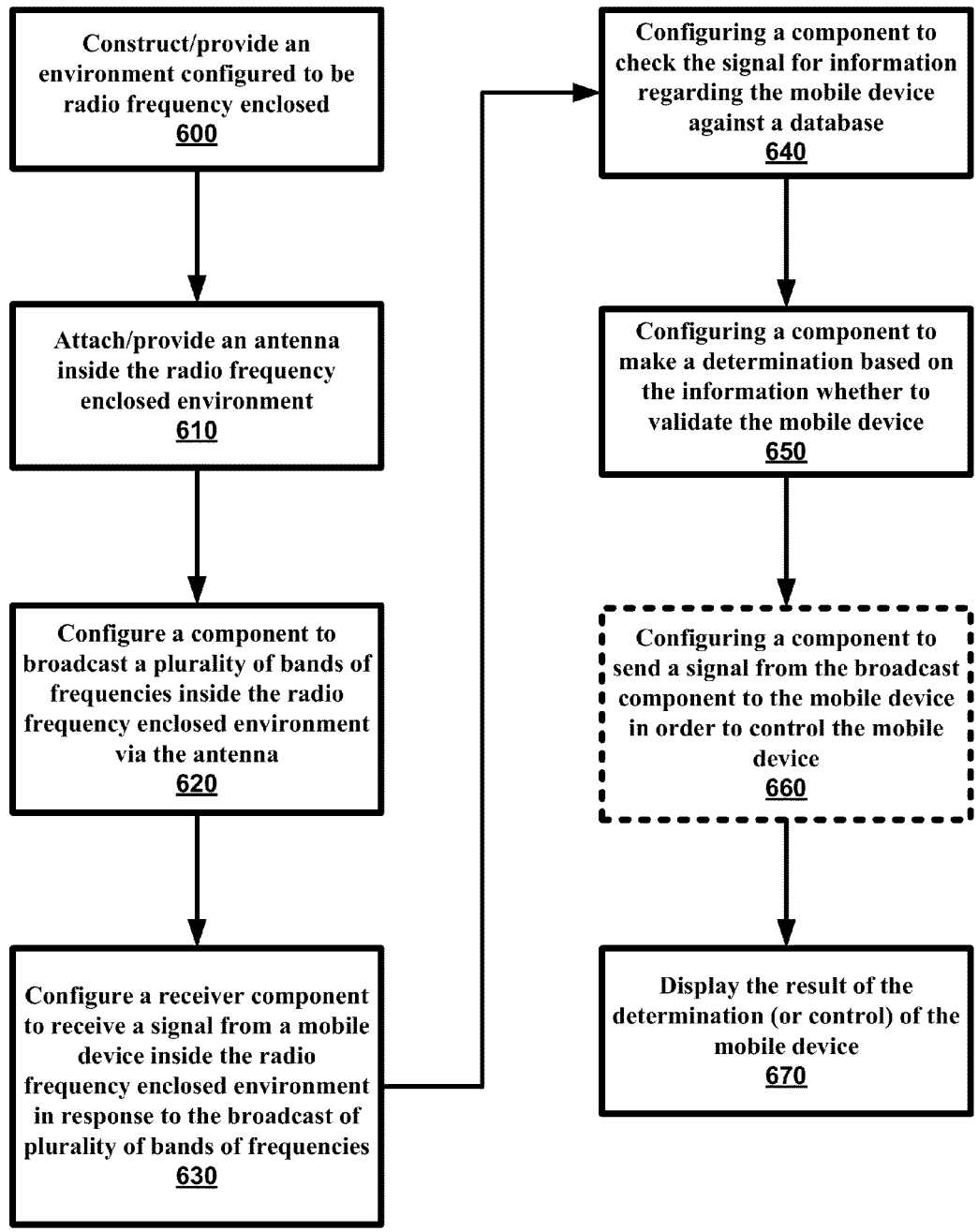
FIG. 6 illustrates in block diagram form an exemplary implementation of localized detection of mobile devices.

FIG. 6 illustrates in block diagram form an exemplary and non-limiting implementation of the various aspects of the presently disclosed subject matter. At block 600, an environment configured to be radio frequency enclosed can be constructed (if made for the first time) or provided (if already made). This environment, at block 610, can contain an attached antenna inside, where the antenna can be a means to communicate with any mobile devices inside the environment.

Next, at block 620, a component can be configured to broadcast a plurality of bands of frequencies and associated communication protocols inside the radio frequency enclosed environment via the antenna. These frequencies can include GSM or WiFi communications or any other standard communications. In another aspect of the presently disclosed subject matter, non-standard frequencies can be used if such frequencies are heuristically known to be used by mobile devices (e.g. intercepted communication frequencies).

At block 630, a receiver component could be configured to receive a signal from a mobile device inside the radio frequency enclosed environment in response to the broadcast of plurality of bands of frequencies. This receiver could be a component integrated with the antenna and the broadcast component as an overall scanning system discussed above (with reference to FIGS. 2-5). Alternatively, all these components could be separate and yet communicatively coupled.

At block 640, another component could be configured to check the signal for information regarding the mobile device against a database, whether such a database would be local to the component or remote, central or distributed. The amount of analysis that the checking component would perform could depend on the context in which a package appears. For example, in an international airline transportation context, a package containing a cell phone might command a vast amount of checking, including not only the phone number and/or equipment information, but also associated user background information. Yet, in another context, such as domestic train transportation context, the checking could be more limited in that legitimate and confirmed phone numbers might suffice. In short, the amount of checking can be proportional to the risk posed by a package containing a mobile device.

At block 650, another component could be configured to make a determination based on the information whether to validate the mobile device. Thus, after a package has been checked, a decision could be made as to how to proceed. Regarding this aspect, various computerized rules and human enabled expert systems could be used, along with various industry and proprietary heuristics. The decision that will be reached will depend on the totality of the circumstances considered by the system, method, or computer readable medium bearing computer executable instructions.

In another aspect of the presently disclosed subject matter, at block 660, another component could be configured to send a signal (e.g. from the broadcast component) to the mobile device in order to control the mobile device. Controlling the device could entail switching off the mobile device, immobilizing communication on the mobile device (e.g. not allowing the mobile device to receive any input/output), overwriting software commands and/or data on the mobile device, and so on. Such control could be exercised pursuant to a determination that the mobile device might pose a risk to a party (such as individual, an enterprise organization, a governmental organization, and so on).

Lastly, at block 670, the results of the determination reached at block 650 can be displayed so that agents or other individuals using these aspects can make informed decisions on how to handle various packages that may contain mobile devices.

Figure 7:
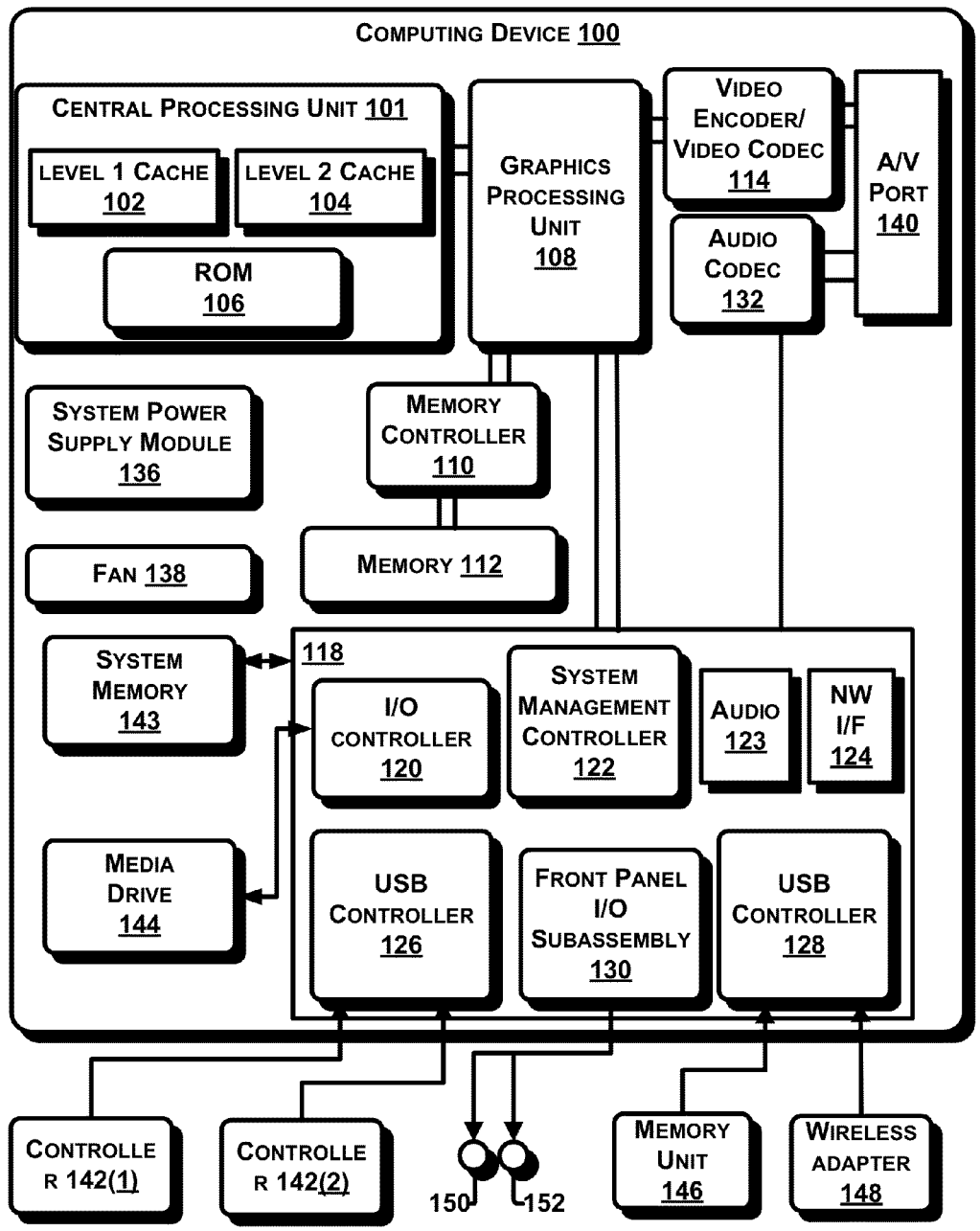
FIG. 7 illustrates in block diagram form an exemplary computing device that can be used in conjunction with the various aspects of localized detection of mobile devices mechanism discussed with reference to FIGS. 1-6 and 8.

The above discussed aspects of localized detection mechanisms for mobile devices can be implemented in a variety of computing and networking environments. Thus, the notion of mobiles devices can include hand-held devices, laptops, cell phones, and so on. Referring to FIG. 7, a block diagram shows an exemplary computing device. This device, which can include a mobile device or a computing analysis device, can comprise, for example, digital audio processing functionality. Specifically, in FIG. 7, a computing device 100 is shown, with a central processing unit (CPU) 101 having a level 1 (L1) cache 102, a level 2 (L2) cache 104, and a flash ROM (Read-only Memory) 106. The level 1 cache 102 and level 2 cache 104 can temporarily store data and hence reduce the number of memory access cycles, thereby improving processing speed and throughput. The flash ROM 106 may store executable code that is loaded during an initial phase of a boot process when the computing device 100 is powered. Alternatively, the executable code that is loaded during the initial boot phase can be stored in a flash memory device (not shown). Further, ROM 106 can be located separately from the CPU 101. These memory devices can cache parts or the entirety of the above mentioned applications, programs, applets, managed code, and so on.

A graphics processing unit (GPU) 108 and a video encoder/video codec (coder/decoder) 114 can form a video processing pipeline for high speed and high resolution graphics processing. Data can be carried from the graphics processing unit 108 to the video encoder/video codec 114 via a bus. The video processing pipeline can output data to an A/V (audio/video) port 140 for transmission to a television or other display. A memory controller 110 can be connected to the GPU 108 and CPU 101 to facilitate processor access to various types of memory 112, such as, but not limited to, a RAM (Random Access Memory).

The computing device 100 can include an I/O controller 120, a system management controller 122, an audio processing unit 123, a network interface controller 124, a first USB host controller 126, a second USB controller 128 and a front panel I/O subassembly 130 that can be preferably implemented on a module 118. The USB controllers 126 and 128 can serve as hosts for peripheral controllers 142(1)-142(2), a wireless adapter 148, and an external memory unit 146 (e.g., flash memory, external CD/DVD ROM drive, removable media, etc.). Moreover, the network interface 124 and/or wireless adapter 148 can provide access to a network (e.g., the Internet, home network, etc.) and may be any of a wide variety of various wired or wireless interface components including an Ethernet card, a modem, a Bluetooth module, a cable modem, and the like.

System memory 143 can be provided to store application data that is loaded during the boot process. A media drive 144 can be provided and can comprise a DVD/CD drive, hard drive, or other removable media drive, etc. The media drive 144 can be internal or external to the computing device 100. Application data can be accessed via the media drive 144 for execution, playback, etc. by the computing device 100. The media drive 144 can be connected to the I/O controller 120 via a bus, such as a Serial ATA bus or other high speed connection (e.g., IEEE 1394).

The system management controller 122 can provide a variety of service functions to assure the availability of the computing device 100. The audio processing unit 123 and an audio codec 132 can form a corresponding audio processing pipeline with high fidelity, 3D, surround, and stereo audio processing according to aspects of the presently disclosed subject matter above. Audio data can be carried between the audio processing unit 123 and the audio codec 126 via a communication link. The audio processing pipeline can output data to the A/V port 140 for reproduction by an external audio player or device having audio capabilities.

The front panel I/O subassembly 130 can support the functionality of the power button 150 and the eject button 152, as well as any LEDs (light emitting diodes) or other indicators exposed on the outer surface of the computing device 100. A system power supply module 136 can provide power to the components of the computing device 100. A fan 138 can cool the circuitry within the computing device 100.

The CPU 101, GPU 108, memory controller 110, and various other components within the computing device 100 can be interconnected via one or more buses, including serial and parallel buses, a memory bus, a peripheral bus, and a processor or local bus using any of a variety of bus architectures.

When the computing device 100 is powered on or rebooted, application data can be loaded from the system memory 143 into memory 112 and/or caches 102, 104 and executed on the CPU 101. Such application data can include some of the online derived data. The application may also present a graphical user interface that provides a consistent user experience when navigating to different media types available on the computing device 100. In operation, applications and/or other media contained within the media drive 144 can be launched or played from the media drive 144 to provide additional functionalities to the computing device 100.

The computing device 100 may be operated as a standalone system by simply connecting the system to a television or other display. In this standalone mode, the computing device 100 may allow one or more users to interact with the system, watch movies, listen to music, and the like. However, with the integration of broadband connectivity made available through the network interface 124 or the wireless adapter 148, the computing device 100 may further be operated as a participant in a larger network community of computing devices. As such a participant, it may interact with other computing devices, whether PCs or servers, and receive information that may be eventually stored. Thus, in short, the computing device 100 can be implemented as any mobile device discussed above. Moreover, the notion of a mobile device includes not only devices that are typically carried by users, but also computing devices that can be moved (that have the potential to be mobile). Hence, the claims should be interpreted to encompass a broad notion of what is a mobile device.

Figure 8:
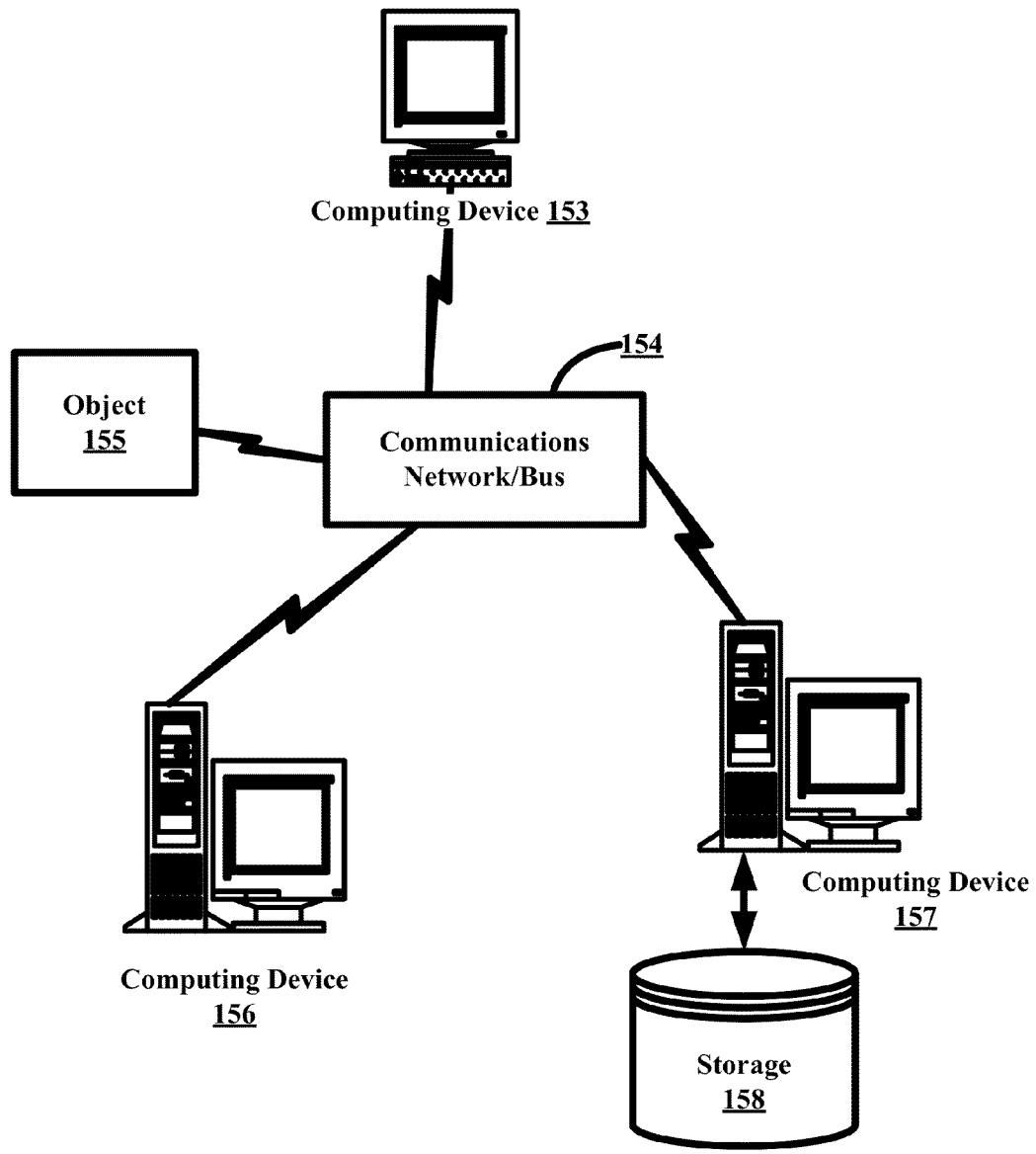
FIG. 8 illustrates an exemplary networking environment for subject matter discussed with reference to FIGS. 1-7.

Next, FIG. 8 illustrates an exemplary networking environment for such mobile devices, as discussed with reference to FIGS. 1-7. The above discussed computing device 100 can correspond to any one of the computing devices 153, 156, 157, or it can be distributed over such devices 153, 156, 157. It can interact with various other objects 155 and storage devices 158 via a communications network/bus 154, where such objects and devices can correspond to other computing devices (whether hardware, firmware, or software). The cross-platform applications can communicate in peer-to-peer networks or client-server based networks, depending on the implementation.

Finally, it should also be noted that the various techniques described herein may be implemented in connection with hardware or software or, where appropriate, with a combination of both. Thus, the methods and apparatus of the presently disclosed subject matter, or certain aspects or portions thereof, can take the form of program code (i.e., instructions) embodied in tangible storage media, such as floppy diskettes, CD-ROMs, hard drives, or any other machine-readable storage medium, where, when the program code is loaded into and executed by a machine, such as a computer, the machine becomes an apparatus for practicing the subject matter.

In the case of program code execution on programmable computers, the computing device may generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing application programming interface (API) or the like, are preferably implemented in a high level procedural or object oriented programming language to communicate with a computer system. However, the program(s) can be implemented in assembly or machine language, if desired. In any case, the language may be a compiled or interpreted language, and combined.

Finally, while the present disclosure has been described in connection with a plurality of exemplary aspects, as illustrated in the various figures and discussed above, it is understood that other similar aspects may be used or modifications and additions may be made to the described aspects for performing the same function of the present disclosure without deviating therefrom. For example, in various aspects of the disclosure, methods, systems, and computer readable media were described configured for providing security by examining mobile devices. However, other equivalent mechanisms to these described aspects are also contemplated by the teachings herein. Therefore, the present disclosure should not be limited to any single aspect, but rather construed in breadth and scope in accordance with the appended claims.

What is claimed:

1. A method comprising:
wirelessly broadcasting a plurality of bands of frequencies inside a wireless radio frequency enclosed environment, wherein the broadcast of the plurality of bands of frequencies is confined within the wireless radio frequency enclosed environment;
selecting a frequency by adjusting a signal strength of the broadcast;
turning on a mobile device inside the wireless radio frequency enclosed environment via the selected frequency;
interrogating the mobile device for information comprising at least one of a mobile identifier or a phone number;
validating the information;
searching for a frequency other than the selected frequency in a background mode while communicating on the selected frequency and
receiving a signal from the mobile device inside the wireless radio frequency enclosed environment in response to the broadcast of the plurality of bands of frequencies.

2. The method of claim 1, further comprising analyzing the signal for information regarding the mobile device.

3. The method of claim 2, further comprising determining, based on the information, whether to validate the mobile device.

4. The method of claim 1, wherein the information comprises at least one of a phone number of the mobile device or equipment information of the mobile device.

5. The method of claim 1, further comprising wirelessly controlling the mobile device.

6. An apparatus comprising:
a processor; and memory coupled to the processor, the memory comprising executable instruction that when executed by the processor cause the processor to effectuate operations comprising:

- wirelessly broadcasting a plurality of bands of frequencies inside a wireless radio frequency enclosed environment, wherein the broadcast of the plurality of bands of frequencies is confined within the wireless radio frequency enclosed environment;
- selecting a frequency by adjusting a signal strength of the broadcast;
- turning on a mobile device inside the wireless radio frequency enclosed environment via the selected frequency;
- interrogating the mobile device for information comprising at least one of a mobile identifier or a phone number;
- validating the information;
- searching for a frequency other than the selected frequency in a background mode while communicating on the selected frequency and
- receiving a signal from the mobile device inside the wireless radio frequency enclosed environment in response to the broadcast of the plurality of bands of frequencies.

7. The apparatus of claim 6, the operations further comprising analyzing the signal for information regarding the mobile device.

8. The apparatus of claim 7, the operations further comprising determining, based on the information, whether to validate the mobile device.

9. The apparatus of claim 6, wherein the information comprises at least one of a phone number of the mobile device or equipment information of the mobile device.

10. The apparatus of claim 6, the operations further comprising wirelessly controlling the mobile device.

11. A computer-readable storage medium that is not a propagating signal, the computer-readable comprising executable instructions that when executed by a processor cause the processor to effectuate operations comprising:

- wirelessly broadcasting a plurality of bands of frequencies inside a wireless radio frequency enclosed environment, wherein the broadcast of the plurality of bands of frequencies is confined within the wireless radio frequency enclosed environment;
- selecting a frequency by adjusting a signal strength of the broadcast;
- turning on a mobile device inside the wireless radio frequency enclosed environment via the selected frequency;
- interrogating the mobile device for information comprising at least one of a mobile identifier or a phone number;
- validating the information;
- searching for a frequency other than the selected frequency in a background mode while communicating on the selected frequency and
- receiving a signal from the mobile device inside the wireless radio frequency enclosed environment in response to the broadcast of the plurality of bands of frequencies.

12. The computer-readable storage medium of claim 11, the operations further comprising analyzing the signal for information regarding the mobile device.

13. The computer-readable storage medium of claim 12 the operations further comprising determining, based on the information, whether to validate the mobile device.

14. The computer-readable storage medium of claim 11, wherein the information comprises at least one of a phone number of the mobile device or equipment information of the mobile device.

15. The computer-readable storage medium of claim 11, the operations further comprising wirelessly controlling the mobile device.

* * * * *